(12) United States Patent
Weber et al.

(10) Patent No.: US 9,645,733 B2
(45) Date of Patent: May 9, 2017

(54) MECHANISM FOR SWITCHING BETWEEN DOCUMENT VIEWING WINDOWS

(75) Inventors: Arnaud Claude Weber, Saratoga, CA (US); Roma Rajni Shah, San Francisco, CA (US); Alex Neely Ainslie, San Francisco, CA (US); Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/312,972

(22) Filed: Dec. 6, 2011

(65) Prior Publication Data

US 2013/0145290 A1 Jun. 6, 2013

(51) Int. Cl.
| | |
|---|---|
| *G06F 3/00* | (2006.01) |
| *G06F 3/0488* | (2013.01) |
| *G06F 3/0483* | (2013.01) |
| *G06F 3/01* | (2006.01) |

(52) U.S. Cl.
CPC ........ *G06F 3/04883* (2013.01); *G06F 3/0483* (2013.01)

(58) Field of Classification Search
USPC ................. 715/760, 769, 864, 202
See application file for complete search history.

(56) References Cited

U.S. PATENT DOCUMENTS

| | | | |
|---|---|---|---|
| 5,140,678 A | 8/1992 | Torres | |
| 5,564,002 A | 10/1996 | Brown | |
| 6,239,798 B1 | 5/2001 | Ludolph et al. | |
| 6,628,309 B1 | 9/2003 | Dodson et al. | |
| 6,727,892 B1* | 4/2004 | Murphy | 345/173 |
| 6,862,712 B1 | 3/2005 | Nakagawa et al. | |
| 7,543,234 B2 | 6/2009 | Daniels et al. | |
| 7,594,185 B2 | 9/2009 | Anderson et al. | |
| 7,681,143 B2 | 3/2010 | Lindsay et al. | |

(Continued)

FOREIGN PATENT DOCUMENTS

| | | |
|---|---|---|
| EP | 0 536 579 A2 | 4/1993 |
| JP | 2010-134738 A | 6/2010 |

(Continued)

OTHER PUBLICATIONS

"Multi-Touch Gestures", Wikipedia, retrieved from <http://en.wikipedia.org/wiki/Multi-touch_gestures>, last modified on Aug. 30, 2011.

(Continued)

*Primary Examiner* — Toan Vu
(74) *Attorney, Agent, or Firm* — McDermott Will & Emery LLP (57) ABSTRACT

Methods for switching between opened web pages in a web browser using a dragging motion across a touchscreen device are provided. In one aspect, a method includes receiving an input of a touch gesture comprising a dragging motion beginning near a first lateral edge of a touchscreen interface towards a second lateral edge of the touchscreen interface, and controlling the switching of a currently displayed open web page in the web browser to another one of a plurality of opened web pages in the web browser based on the touch gesture. The selection of which open web page to switch to is determined based on the distance of the dragging motion of the touch gesture. Systems, graphical user interfaces, and machine-readable media are also provided.

23 Claims, 8 Drawing Sheets

(56) References Cited

U.S. PATENT DOCUMENTS

| | | | |
|---|---|---|---|
| 7,735,018 B2 | 6/2010 | Bakhash | |
| 7,797,641 B2 | 9/2010 | Karukka et al. | |
| 7,904,826 B2 | 3/2011 | Vronay et al. | |
| 7,954,064 B2 | 5/2011 | Forstall et al. | |
| 8,046,712 B2 | 10/2011 | Landman et al. | |
| 8,166,415 B2 | 4/2012 | Cisler et al. | |
| 8,214,768 B2 | 7/2012 | Boule et al. | |
| 8,239,785 B2 | 8/2012 | Hinckley et al. | |
| 8,543,935 B2 | 9/2013 | Duffy | |
| 8,578,290 B2 | 11/2013 | Amadio et al. | |
| 8,605,034 B1 | 12/2013 | Roy | |
| 8,638,292 B2 | 1/2014 | Kawakami et al. | |
| 9,507,588 B2 | 11/2016 | Arriola et al. | |
| 2003/0189597 A1 | 10/2003 | Anderson et al. | |
| 2005/0125739 A1 | 6/2005 | Thompson et al. | |
| 2005/0188329 A1 | 8/2005 | Cutler et al. | |
| 2005/0273466 A1 | 12/2005 | Yoon | |
| 2006/0026535 A1* | 2/2006 | Hotelling et al. | 715/863 |
| 2006/0036962 A1 | 2/2006 | Jobs et al. | |
| 2006/0161861 A1 | 7/2006 | Holecek et al. | |
| 2006/0224991 A1 | 10/2006 | Stabb et al. | |
| 2007/0038955 A1 | 2/2007 | Nguyen | |
| 2008/0034314 A1 | 2/2008 | Louch et al. | |
| 2008/0040692 A1* | 2/2008 | Sunday et al. | 715/863 |
| 2008/0165152 A1 | 7/2008 | Forstall et al. | |
| 2008/0168401 A1 | 7/2008 | Boule et al. | |
| 2008/0195961 A1 | 8/2008 | Bae et al. | |
| 2008/0297483 A1* | 12/2008 | Kim et al. | 345/173 |
| 2008/0320419 A1* | 12/2008 | Matas et al. | 715/863 |
| 2009/0077501 A1* | 3/2009 | Partridge et al. | 715/846 |
| 2009/0178007 A1* | 7/2009 | Matas et al. | 715/835 |
| 2009/0204925 A1 | 8/2009 | Bhat et al. | |
| 2009/0228820 A1 | 9/2009 | Kim et al. | |
| 2009/0237367 A1* | 9/2009 | Ryu et al. | 345/173 |
| 2009/0237372 A1* | 9/2009 | Kim et al. | 345/173 |
| 2009/0265628 A1 | 10/2009 | Bamford et al. | |
| 2009/0267909 A1 | 10/2009 | Chen et al. | |
| 2009/0322692 A1* | 12/2009 | Kim et al. | 345/173 |
| 2010/0020035 A1* | 1/2010 | Ryu et al. | 345/173 |
| 2010/0031185 A1 | 2/2010 | Wilson et al. | |
| 2010/0039400 A1* | 2/2010 | Jang | 345/173 |
| 2010/0044121 A1* | 2/2010 | Simon et al. | 178/18.03 |
| 2010/0107046 A1* | 4/2010 | Kang et al. | 715/207 |
| 2010/0125817 A1* | 5/2010 | Kang et al. | 715/863 |
| 2010/0211872 A1 | 8/2010 | Rolston et al. | |
| 2010/0222112 A1* | 9/2010 | Han | 455/566 |
| 2010/0251154 A1 | 9/2010 | Chang et al. | |
| 2010/0298034 A1* | 11/2010 | Shin et al. | 455/566 |
| 2010/0313126 A1* | 12/2010 | Jung et al. | 715/702 |
| 2010/0317503 A1* | 12/2010 | Subramanian et al. | 501/42 |
| 2011/0004821 A1* | 1/2011 | Miyazawa et al. | 715/702 |
| 2011/0037720 A1 | 2/2011 | Hirukawa et al. | |
| 2011/0039603 A1* | 2/2011 | Kim et al. | 455/566 |
| 2011/0047459 A1 | 2/2011 | Van Der Westhuizen | |
| 2011/0050591 A1* | 3/2011 | Kim et al. | 345/173 |
| 2011/0050594 A1* | 3/2011 | Kim et al. | 345/173 |
| 2011/0050602 A1* | 3/2011 | Jeong et al. | 345/173 |
| 2011/0061021 A1* | 3/2011 | Kang et al. | 715/800 |
| 2011/0078624 A1 | 3/2011 | Missig et al. | |
| 2011/0083105 A1 | 4/2011 | Shin et al. | |
| 2011/0087982 A1 | 4/2011 | McCann et al. | |
| 2011/0128241 A1* | 6/2011 | Kang et al. | 345/173 |
| 2011/0167350 A1* | 7/2011 | Hoellwarth | 715/727 |
| 2011/0179368 A1 | 7/2011 | King | |
| 2011/0179386 A1 | 7/2011 | Shaffer et al. | |
| 2011/0184738 A1* | 7/2011 | Kalisky et al. | 704/260 |
| 2011/0208712 A1* | 8/2011 | Jones et al. | 707/706 |
| 2011/0209057 A1* | 8/2011 | Hinckley et al. | 715/702 |
| 2011/0209104 A1* | 8/2011 | Hinckley et al. | 715/863 |
| 2011/0210932 A1* | 9/2011 | Ryu et al. | 345/173 |
| 2011/0252357 A1 | 10/2011 | Chaudhri | |
| 2011/0256848 A1* | 10/2011 | Bok et al. | 455/411 |
| 2011/0260829 A1* | 10/2011 | Lee | 340/5.51 |
| 2011/0265002 A1 | 10/2011 | Hong et al. | |
| 2011/0265036 A1 | 10/2011 | Hoehne | |
| 2011/0296333 A1 | 12/2011 | Bateman et al. | |
| 2011/0296334 A1* | 12/2011 | Ryu et al. | 715/776 |
| 2011/0296351 A1 | 12/2011 | Ewing, Jr. et al. | |
| 2011/0307778 A1* | 12/2011 | Tsai et al. | 715/702 |
| 2012/0007854 A1* | 1/2012 | Cho | 345/419 |
| 2012/0026118 A1 | 2/2012 | Hackborn | |
| 2012/0030625 A1* | 2/2012 | Miyazaki | 715/830 |
| 2012/0054663 A1* | 3/2012 | Baek et al. | 715/772 |
| 2012/0081399 A1 | 4/2012 | Sirpal et al. | |
| 2012/0083260 A1* | 4/2012 | Arriola et al. | 455/418 |
| 2012/0084647 A1* | 4/2012 | Homma et al. | 715/273 |
| 2012/0089938 A1* | 4/2012 | Homma et al. | 715/776 |
| 2012/0096395 A1 | 4/2012 | Ording et al. | |
| 2012/0102425 A1* | 4/2012 | Song | 715/776 |
| 2012/0124505 A1 | 5/2012 | St. Jacques, Jr. | |
| 2012/0127109 A1* | 5/2012 | Nishio et al. | 345/173 |
| 2012/0130764 A1* | 5/2012 | Harthcryde et al. | 705/7.14 |
| 2012/0131496 A1 | 5/2012 | Goossens et al. | |
| 2012/0166975 A1* | 6/2012 | Oh et al. | 715/760 |
| 2012/0167017 A1* | 6/2012 | Oh | 715/863 |
| 2012/0174042 A1* | 7/2012 | Chang | 715/863 |
| 2012/0210270 A1 | 8/2012 | Kwon et al. | |
| 2012/0242584 A1 | 9/2012 | Tuli | |
| 2012/0246596 A1 | 9/2012 | Ording et al. | |
| 2012/0297335 A1* | 11/2012 | Ramasubramanian et al. | 715/787 |
| 2012/0311438 A1 | 12/2012 | Cranfill et al. | |
| 2013/0047125 A1* | 2/2013 | Kangas et al. | 715/863 |
| 2013/0095464 A1* | 4/2013 | Ediger et al. | 434/322 |
| 2013/0097556 A1 | 4/2013 | Louch | |
| 2013/0111395 A1* | 5/2013 | Ying et al. | 715/783 |
| 2013/0117698 A1* | 5/2013 | Park et al. | 715/765 |
| 2013/0132906 A1 | 5/2013 | Siurumaa et al. | |
| 2013/0201113 A1 | 8/2013 | Hinckley et al. | |
| 2013/0232409 A1* | 9/2013 | Cranfill et al. | 715/256 |
| 2013/0239063 A1 | 9/2013 | Ubillos et al. | |
| 2013/0298069 A1* | 11/2013 | Petschnigg et al. | 715/776 |
| 2014/0123081 A1* | 5/2014 | Park et al. | 715/863 |
| 2014/0165006 A1* | 6/2014 | Chaudhri et al. | 715/835 |
| 2014/0229911 A1* | 8/2014 | Inamoto | 717/105 |
| 2015/0026630 A1* | 1/2015 | Bullock | 715/776 |

FOREIGN PATENT DOCUMENTS

| | | |
|---|---|---|
| JP | 2011-022811 A | 2/2011 |
| WO | WO-2011/007401 A1 | 1/2011 |

OTHER PUBLICATIONS

"Life Web Browser v1.5", It's About Time, retrieved from <http://www.itsabouttimeproducts.com/Its_About_Time/Life.html>, printed on Oct. 5, 2011.

"Grazing Browser—Features", retrieved from <http://grazingbrowser.com/features.php>, printed Oct. 5, 2011.

"Quick Start Guide", retrieved from <http://www.perfectbrowser.com/quickstart_ipad.html>, printed on Oct. 5, 2011.

Anonymous, iPod touch Benutzerhandbuch (with iPhone 2.1 Software), Sep. 9, 2008, retrieved from http://manuals.info.apple.com/de_DE/iPod_touch_2.1_Benutzerhandbuch.pdf.

Japanese Office Action mailed Jan. 10, 2017, which issued in Japanese Application No. 2015-531072.

* cited by examiner

MECHANISM FOR SWITCHING BETWEEN DOCUMENT VIEWING WINDOWS

BACKGROUND

Field

The present disclosure generally relates to the transmission of data over a network, and more particularly to the use of a computing device to display data communicated over a network.

Description of the Related Art

Mobile devices, such as tablets, have limited size displays ("viewports") as compared to desktops and laptop computers. As a result, applications for mobile devices have limited screen space to display content. For example, mobile web browsers cannot display multiple web pages at the same time within the viewport, so they often use a tabbed document interface to open separate tabbed web page viewing windows ("tabs") within the web browser and display one tab at a time. In order to switch between multiple tabs on a touchscreen mobile device, a user usually must first press a button on the touchscreen to enter a tab switching mode, and then select a tab to switch to from among the displayed tabs. In order to select the tab switching button, the user may often need to adjust the user's physical position in order to reach and press the tab switching button. This makes switching tabs a slower, two-step process that requires the user to adjust the user's position.

SUMMARY

According to one embodiment of the present disclosure, a computer-implemented method for switching between opened web pages in a web browser using a dragging motion across a touchscreen device is provided. The method includes receiving an input of a touch gesture including a dragging motion beginning near a first lateral edge of a touchscreen interface towards a second lateral edge of the touchscreen interface, and controlling the switching of a currently displayed open web page in the web browser to another one of a plurality of opened web pages in the web browser based on the touch gesture. The selection of which open web page to switch to is determined based on the distance of the dragging motion of the touch gesture.

According to one embodiment of the present disclosure, a system for switching between opened web pages in a web browser using a dragging motion across a touchscreen device is provided. The system includes a memory including a web browser, the web browser including a plurality of opened web pages, and a processor. The processor is configured to receive an input of a touch gesture including a dragging motion beginning near a first lateral edge of a touchscreen interface towards a second lateral edge of the touchscreen interface, and control, based on the touch gesture, the switching of a currently displayed open web page in the web browser to another one of the plurality of opened web pages in the web browser. The processor is also configured to provide, for display, the open web page to which the web browser will be switched to during the dragging motion. The selection by the processor of which open web page to switch to is determined based on the distance of the dragging motion of the touch gesture.

According to one embodiment of the present disclosure, a web browser with functionality for switching between opened web pages using a touchscreen device is provided. The web browser includes an input area configured to receive an input of a touch gesture including a dragging motion beginning near a first lateral edge of a touchscreen interface towards a second lateral edge of the touchscreen interface, the input area defined in the web browser between the first lateral edge of the touchscreen interface, a predefined distance from the first lateral edge of the touchscreen interface towards the second lateral edge of the touchscreen interface, and the lateral height of the touchscreen interface. The web browser also includes a document viewer configured to control, based on the touch gesture, the switching of a currently displayed open web page in the web browser to another one of a plurality of opened web pages in the web browser. The selection of which open web page to switch to is determined based on the distance of the dragging motion of the touch gesture.

According to one embodiment of the present disclosure, a machine-readable storage medium including machine-readable instructions for causing a processor to execute a method for switching between opened web pages in a web browser using a dragging motion across a touchscreen device is provided. The method includes receiving, within an input area defined in the web browser between a first lateral edge of a touchscreen interface, a predefined distance from the first lateral edge of the touchscreen interface towards a second lateral edge of the touchscreen interface, and the lateral height of the touchscreen interface, an input of a touch gesture including a dragging motion beginning near the first lateral edge of the touchscreen interface towards the second lateral edge of the touchscreen interface. The method also includes controlling, based on the touch gesture, the switching of a currently displayed open web page in the web browser to another one of a plurality of opened web pages in the web browser, and providing, for display, the open web page to which the web browser will be switched to and an indicator of a location of the touch gesture on the touchscreen interface during the dragging motion. The selection of which open web page to switch to is determined based on the distance of the dragging motion of the touch gesture.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed web browser allows a user to quickly switch between multiple tabs by swiping from one lateral side of a touchscreen to the other lateral side of the touchscreen. The tab switching process starts by the user swiping from near or off of an initial lateral side (e.g., the right side) of the touchscreen towards the other lateral side (e.g., the left side) of the touchscreen. As the user drags the user's finger in a swiping motion from the initial lateral side of the touchscreen towards the other lateral side of the touchscreen, the displayed tab switches from the currently displayed tab to a tab positioned in the direction of the swipe (e.g., if the user swipes to the left, tabs to the left of the initial tab the user was viewing are displayed). The user lifts the user's finger from the touchscreen and ends the swiping motion once the desired tab is displayed.

The farther the user swipes, the more tabs the user switches between. If the user reverses the direction of the swipe back towards the initial lateral side of the touchscreen during the tab switching process, the user can switch to tabs positioned in the opposite direction (e.g., if the user reverses direction and swipes back to the right, tabs to the right of the currently displayed tab are displayed).

A predefined portion of each of the horizontal edges of the touchscreen is designated for entering the tab switch mode, and a predetermined distance of swiping is designated for switching from one tab to another. In order to quickly display tabs during the tab selection process, a previously captured image of each tab can be displayed during the tab selection process. In another embodiment, the user can be limited to switching to one other tab (i.e., the tab next to the current tab) by swiping from one lateral edge of the touchscreen in the direction of the other lateral edge of the touchscreen.

Figure 1:
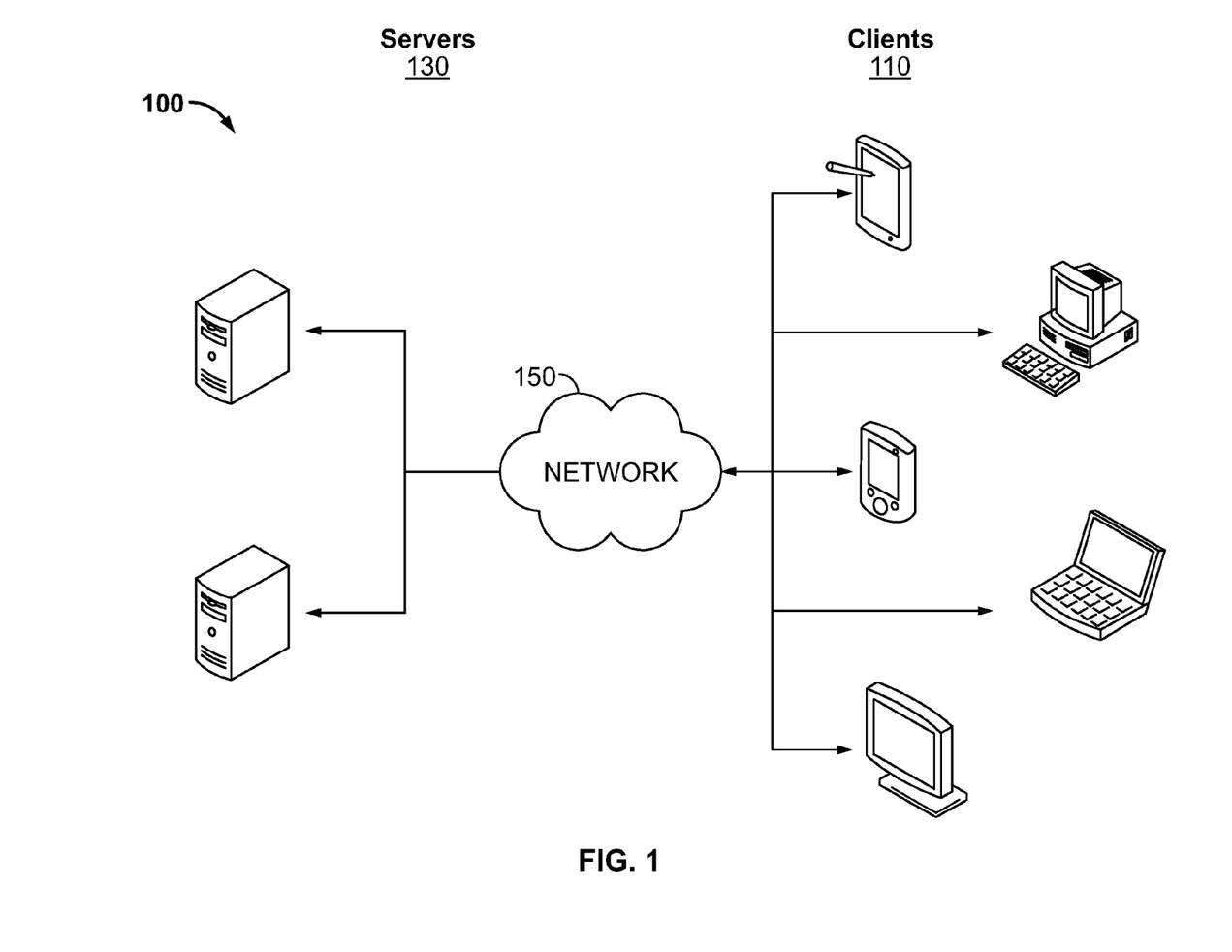
FIG. 1 illustrates an exemplary architecture for switching between opened web pages in a web browser using a dragging motion across a touchscreen device.

Turning to the drawings, FIG. 1 illustrates an exemplary architecture 100 for switching between opened web pages in a web browser using a dragging motion across a touchscreen device. The architecture 100 includes servers 130 and clients 110 connected over a network 150.

Each of the clients 130 is configured to download, install, and run a web browser as disclosed herein. The web browser is configured to run on clients 130 that are mobile or non-mobile. The clients 110 can be, for example, desktop computers, laptop computers, mobile devices (e.g., a smartphone, tablet computer, or PDA), set top boxes (e.g., for a television), video game consoles, or any other devices having appropriate processor, memory, and communications capabilities. In certain aspects, certain advantages of the web browser, such as less effort made by the user to switch tabs, are most salient on clients 110 that are mobile devices (e.g., tablet computers or smartphones) or that otherwise have limited display areas.

The web browser, once installed on a client 130, is configured to load web pages from any one or multiple client servers 130 hosting the web pages. The servers 130 can be any device having an appropriate processor, memory, and communications capability for hosting the data for installing the web browser and for hosting the web pages. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed web browser, once downloaded from a server 130 and installed and executed on a client 130, is configured to display tab indicators to represent opened web page viewing windows, and switch between tab indicators using a swiping touch input motion received from a user that starts near one lateral edge of the touchscreen within the display of the web browser in the direction of the other lateral edge of the touchscreen. As the user continues the swiping motion in either direction, the web browser switches to displaying the next tabbed browsing window in that same direction until the user releases the touch input.

Figure 2:
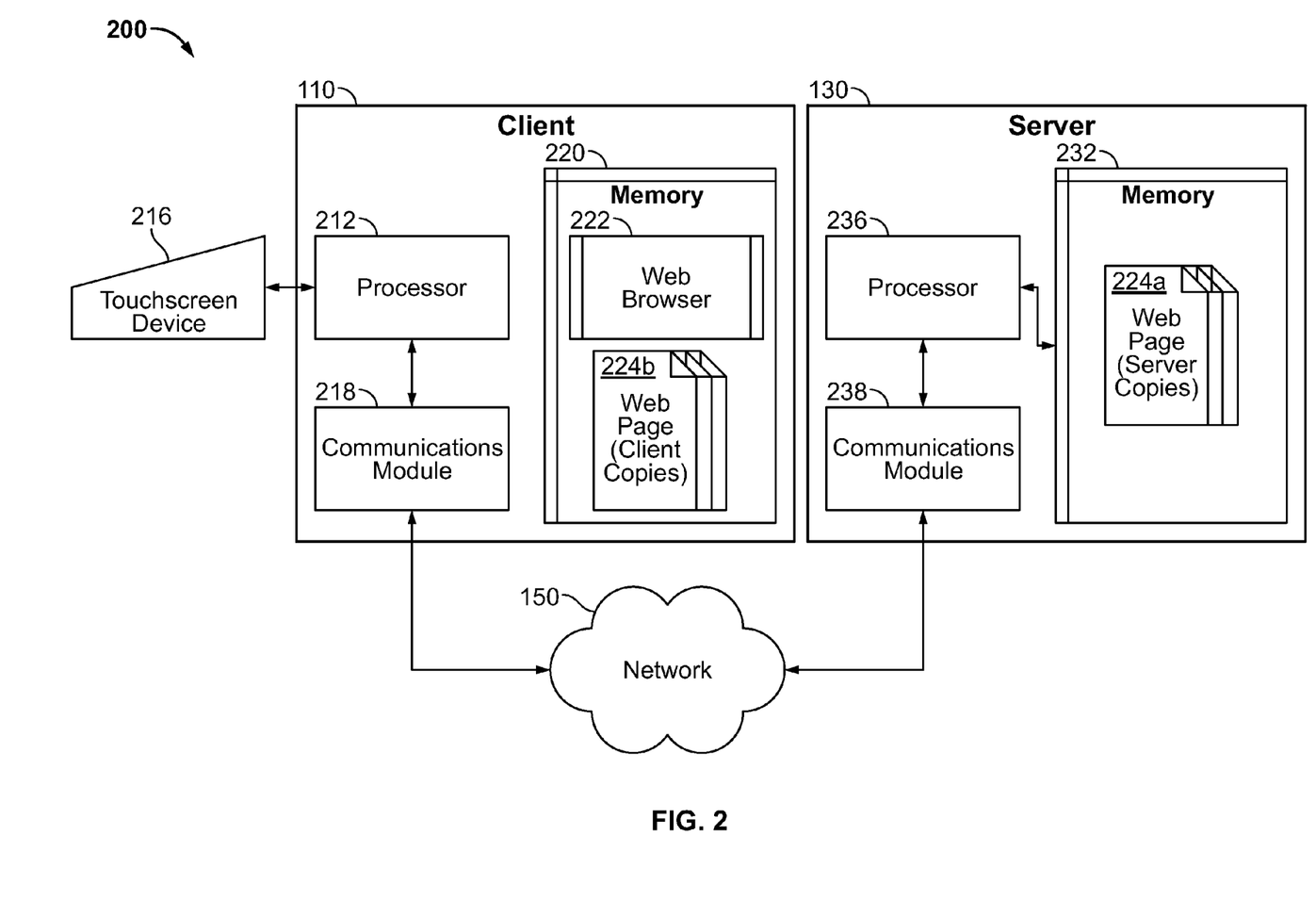
FIG. 2 is a block diagram illustrating an exemplary client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220. The memory 220 includes a web browser 222 and a client copies of web pages/tabs 224b to display in the web browser 222 using the output device 214 (e.g., a display) of the client 110. The client 110 also includes a combined input/output device 216, such as a touchscreen device 216. In certain aspects, the touchscreen device 216 provides touch sensitivity across the entire display of the client 110. In certain aspects, the touchscreen device 216 is limited to a touch-sensitive area that frame the display of the client 110, such that the touch input features described herein are limited to the touch-sensitive area framing the display of the client 110. Alternatively, the client 110 can include a separate input device, such as a keyboard, touchscreen, or mouse, and an output device. The client copies of the web pages 224b are obtained over the network 150 from the processor 236 of the server 130 using server copies of the web pages 224a stored in the memory 232 of the server 130. Although the server copies of the web pages 224a are illustrated as being stored on one server 130, they can also be stored on many different servers.

The processor 212 of the client 110 is configured to execute instructions, such as instructions physically coded into the processor 212, instructions received from software in memory 240, or a combination of both. For example, the processor 212 of the client 110 executes instructions from the web browser 222 to receive an input of a touch gesture that includes a dragging motion beginning near a first lateral edge of the touchscreen device 216 towards a second lateral edge of the touchscreen device 216. The dragging motion does not need to stay substantially parallel along an axis, but can be from near one lateral edge (e.g., one side) of the touchscreen towards the other lateral edge (e.g., opposing side) of the touchscreen. In certain aspects, the dragging motion can begin near any edge of the touchscreen device 216 in the direction of any other edge of the touchscreen device 216. For example, if the touchscreen device 216 is substantially circular shaped, the dragging motion can begin near a bottom of the circle in the direction of the right side of the circle. As another example, for a rectangular shaped touchscreen device 216, the dragging motion can begin near the bottom edge of the touchscreen device 216 in the direction of the top edge of the touchscreen device 216.

The dragging motion can begin in an input area defined in the web browser 222 displayed on the touchscreen device 216 between the first lateral edge of the touchscreen device 216, a predefined distance from the first lateral edge of the touchscreen device 216 towards the second lateral edge of the touchscreen device 216, and the lateral height (e.g., the vertical length) of the touchscreen device 216 (within the web browser 222). The input can be configured to be received at or near any lateral edge of the touchscreen device 216. When, for example, the input is configured to be at a lateral edge of the touchscreen device 216, then the input dragging motion can begin by moving from off of one lateral edge of the touchscreen device 216 (e.g., on a frame that borders the touchscreen device 216) back onto the touchscreen device 216 in the direction of the other lateral edge of the touchscreen device 216.

A touch gesture received within the input area can be used by the processor 212 for switching of the currently displayed open web page 224b in the web browser 222 to another one of the opened web pages 224b in the web browser 222, and a touch gesture received outside the input area within the web browser 222 can be used by the processor 212 for interacting with the currently displayed open web page 224b in the web browser 222. For example, during the dragging motion of the touch gesture, one of the several open web pages 224b to which the web browser 222 can be switched to is provided for display. The display can be a screenshot (e.g., in JPEG format) of the opened web page 224b that was captured the last time the opened web page 224b was displayed in the web browser 222, and the captured screenshot can be displayed during the dragging motion until the dragging motion is completed. Additionally, an indicator of a location of the touch gesture on the touchscreen device 216 can be provided for display, for example, underneath the location of the touch gesture on the touchscreen device 216, thereby facilitating the user's understanding of the current location of the dragging motion. The indicator can move with the touch gesture. Although the examples described herein relate to switching between opened web pages 224 in the web browser 224, the touch gesture received within the input area can also be used by the processor 212 for switching between a currently displayed application in an operating system on the client 110 to another application on the client 110.

The selection of which open web page 224b to switch to is determined by the processor 212 based on the distance of the dragging motion of the touch gesture. For example, the farther the touch gesture is dragged across the touchscreen device 216, the more open web pages 224b the web browser 222 switches between. This can be achieved, for example, by switching between each of the plurality of opened web pages based on a predetermined number of pixels within the touchscreen device 216. The number of pixels can be determined based on the number of opened web pages 224b in the web browser 222. For example, with a touchscreen device 216 having a display width of 400 pixels and five opened web pages 224b, a dragging distance of 80 pixels can be set as the threshold to switch from one opened web page 224b to another opened web page 224b. In certain aspects, the number of pixels can be pre-defined without regard to the number of opened web pages 224b in the web browser 222. Thus, a user can become familiar with the dragging motion distance it takes to switch between opened web pages 224b regardless of how many opened web pages 224b are in the web browser 222.

The selection of which open web page 224b to switch to can also be determined by the processor 212 regardless of the distance of the dragging motion of the touch gesture. For example, the web browser 222 can be configured to limit switching from the currently displayed open web page 224b in the web browser 222 to the next opened web pages 224b in the web browser 222 (e.g., indicated by a neighboring tab indicator in a tab bar) regardless of the distance of the dragging motion of the touch gesture. The selection of which open web page 224b to switch can further be determined by the processor 212 based on the velocity of the dragging motion of the touch gesture. For example, the more quickly a user's touch gesture moves across a set distance on the touchscreen device 216, the more open web pages 224b the web browser 222 switches between. If, however, the angle of the user's touch gesture were different (e.g., vertical instead of horizontal), then the processor 212 can interpret the user's touch input for another action (e.g., scrolling).

The switching from the currently displayed open web page 224b in the web browser 222 to another one of the opened web pages 224b in the web browser 222 is completed when the input of the touch gesture is completed.

Figure 3:
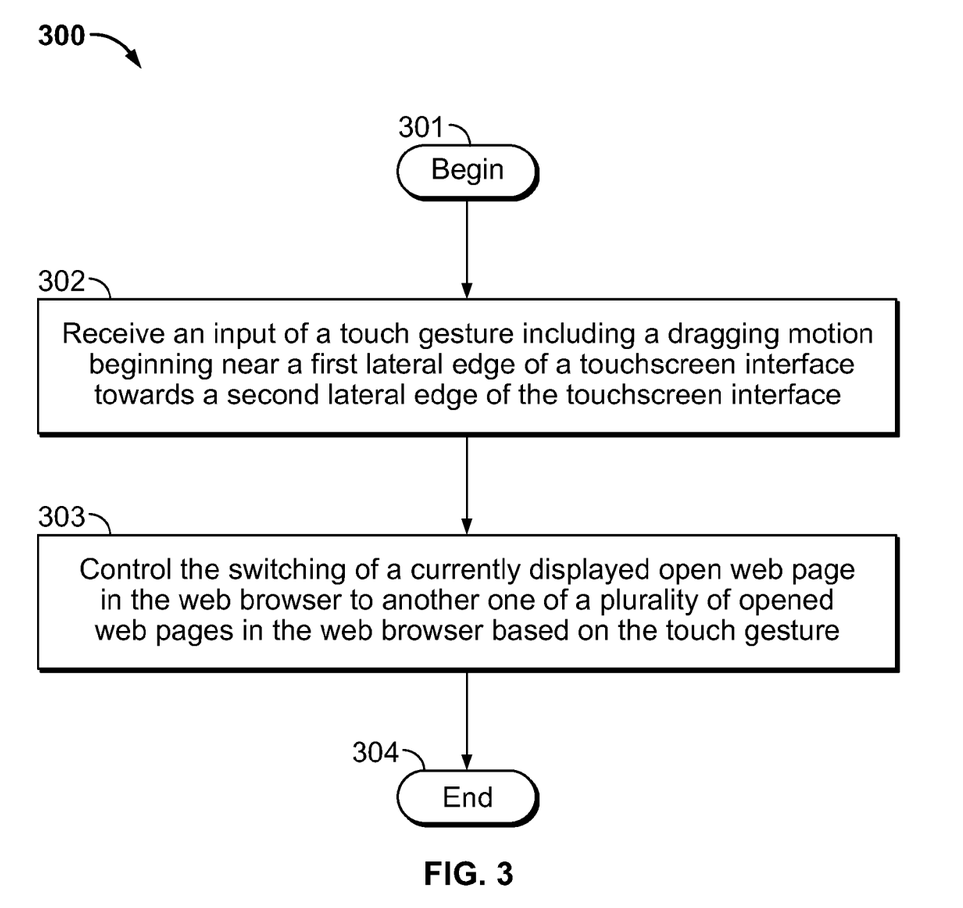
FIG. 3 illustrates an exemplary process for switching between opened web pages in a web browser using a dragging motion across a touchscreen device with the exemplary client of FIG. 2.

FIG. 3 illustrates an exemplary process 300 for switching between opened web pages 224b in a web browser 222 using a touchscreen device 216 using the exemplary client 110 of FIG. 2. The example refers to an exemplary tablet 110 as the exemplary client 110.

Figure 4A:
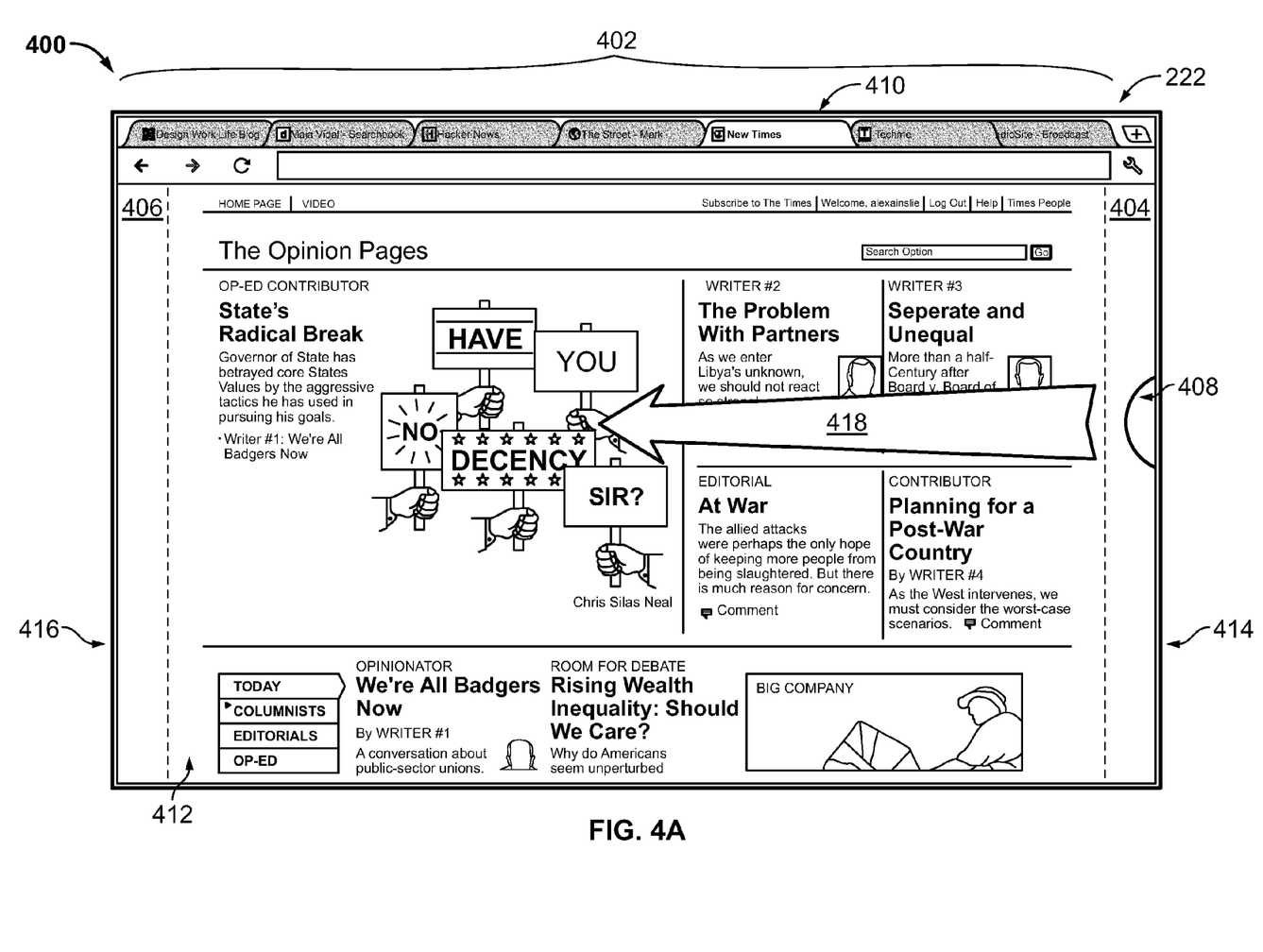
FIGS. 4A-4D are exemplary screenshots associated with the exemplary process of FIG. 3.

The process 300 begins by proceeding from step 301 when a user loads a web browser 222 on the user's tablet 110 to step 302 when the user provides a dragging motion touch gesture input on the tablet touchscreen 216. As illustrated in FIG. 4A, an exemplary screenshot 400 of a currently displayed open web page 412 in the web browser on the tablet 110, the motion begins near a first lateral edge 414 of the touchscreen device 216 in the direction 418 of a second lateral edge 416 of the touchscreen device 216. As indicated by the displayed touch indicator 408, the motion begins within a first input area 404 near the first lateral edge 414. The motion can also begin with a second input area 406 near the second lateral edge 416. The currently opened web page 412 is indicated by the tab 410 in the tab bar 402, while the other tabs in the tab bar are dimmed.

Figure 4B:
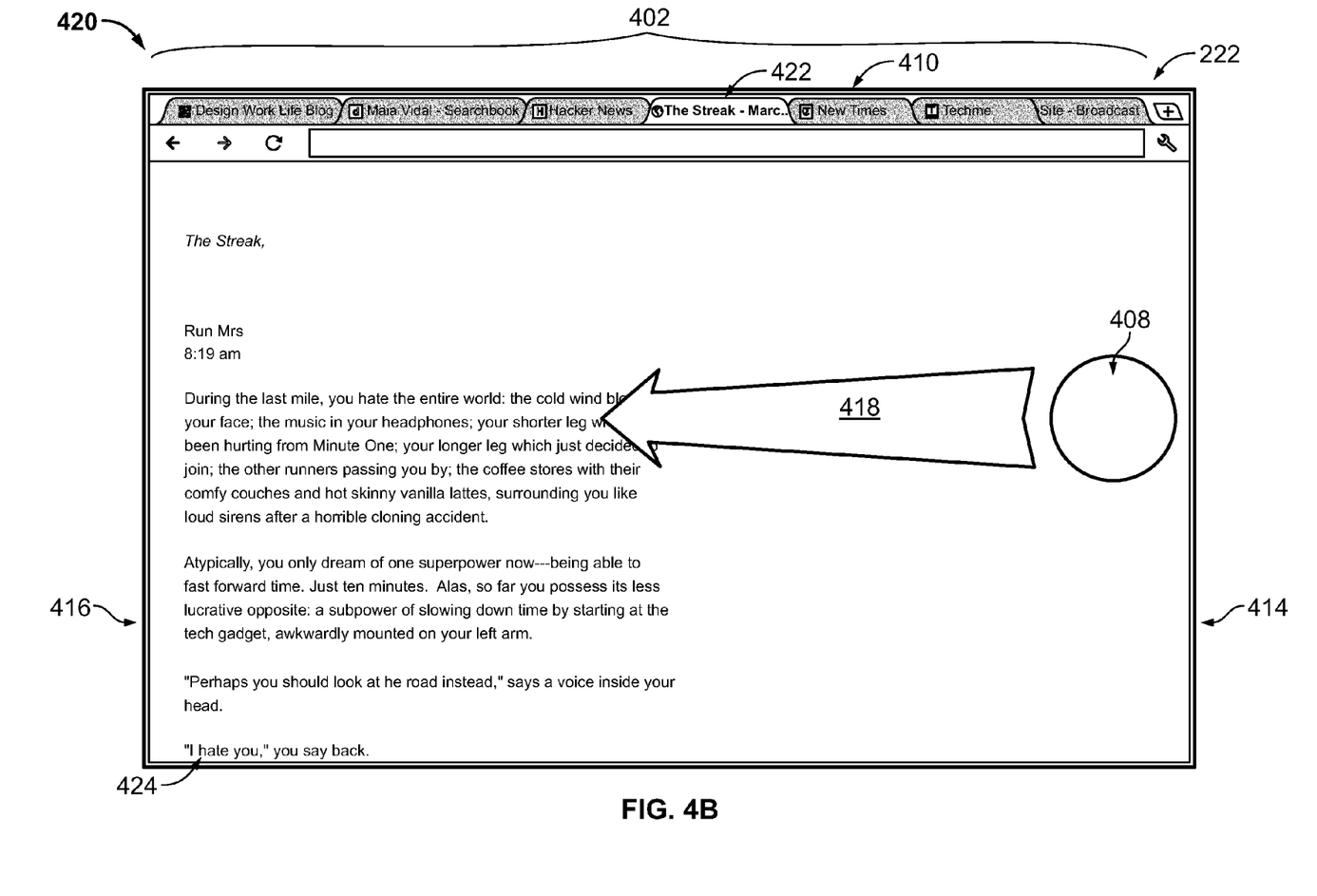

Next, in step 302, the currently displayed open web page 412 in the web browser 222 is switched to another one of the opened web pages 224b in the web browser 222 based on the control of the touch gesture. FIG. 4B is an exemplary screenshot 420 of another opened web page 424 in the web browser 222 that is switched to from the previously displayed opened web page 412 based on the touch gesture. The selection of which open web page 224b to switch to is determined based on the distance of the dragging motion of the touch gesture. As the dragging motion of the touch gesture (as indicated by the touch indicator 408) continues to move in the direction 418 of the second lateral edge 416, the currently displayed open web page changes to the next open web page indicated by a corresponding tab indicator 422 in the tab bar 402 that neighbors the tab indicator 410 of the previously displayed open web page 412 in the direction 418 of the dragging motion.

Figure 4C:
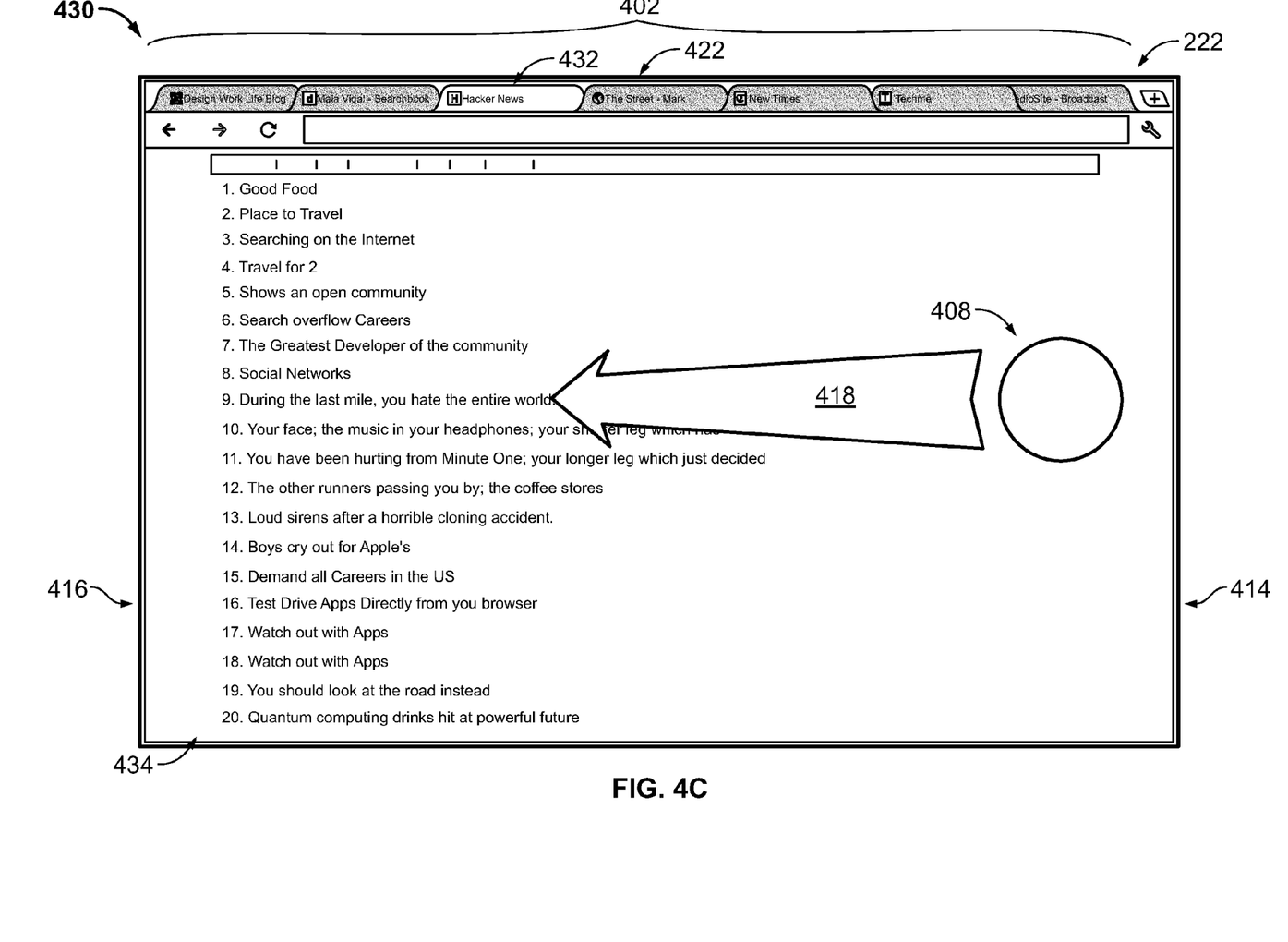

FIG. 4C is an exemplary screenshot 430 of yet another opened web page 424 in the web browser 222 that is switched to from the previously displayed opened web page 424 based on the continued dragging motion of the touch gesture. As the dragging motion of the touch gesture (as indicated by the touch indicator 408) continues to move in the direction 418 of the second lateral edge 416, the displayed open web page 424 of FIG. 4B changes to the next open web page displayed in FIG. 4C indicated by a corresponding tab indicator 432 in the tab bar 402 that neighbors the tab indicator 422 of the previously displayed open web page 424 in the direction 418 of the dragging motion.

Figure 4D:
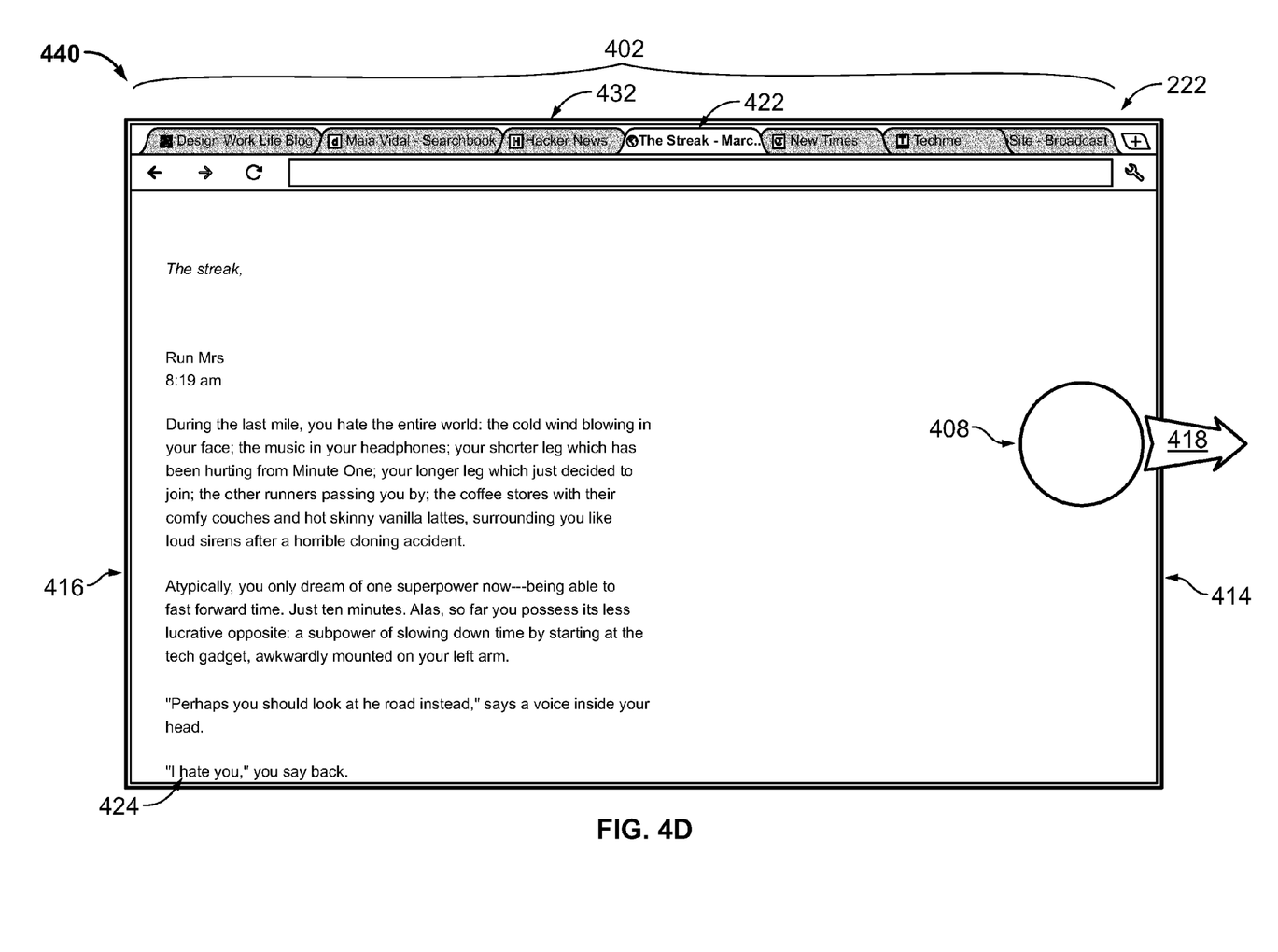

FIG. 4D is an exemplary screenshot 440 of an opened web page 424 in the web browser 222 that is switched to from the previously displayed opened web page 424 by reversing the direction 418 of the dragging motion of the touch gesture. Specifically, the user moves the user's dragging motion of the touch gesture (as indicated by the touch indicator 408) in the opposite direction 418, namely, in the direction 418 of the first lateral edge 414 from the second lateral edge 416. The displayed open web page 434 of FIG. 4C changes back to the open web page displayed in FIG. 4D indicated by the corresponding tab indicator 422 in the tab bar 402 that neighbors the tab indicator 432 of the previously displayed open web page 424 in the new, opposite direction 418 of the dragging motion. The user then releases the touch input, thereby ending the dragging motion, leaving the user to interact with the displayed open web page 424 of FIG. 4D. The process 300 then ends.

Figure 5:
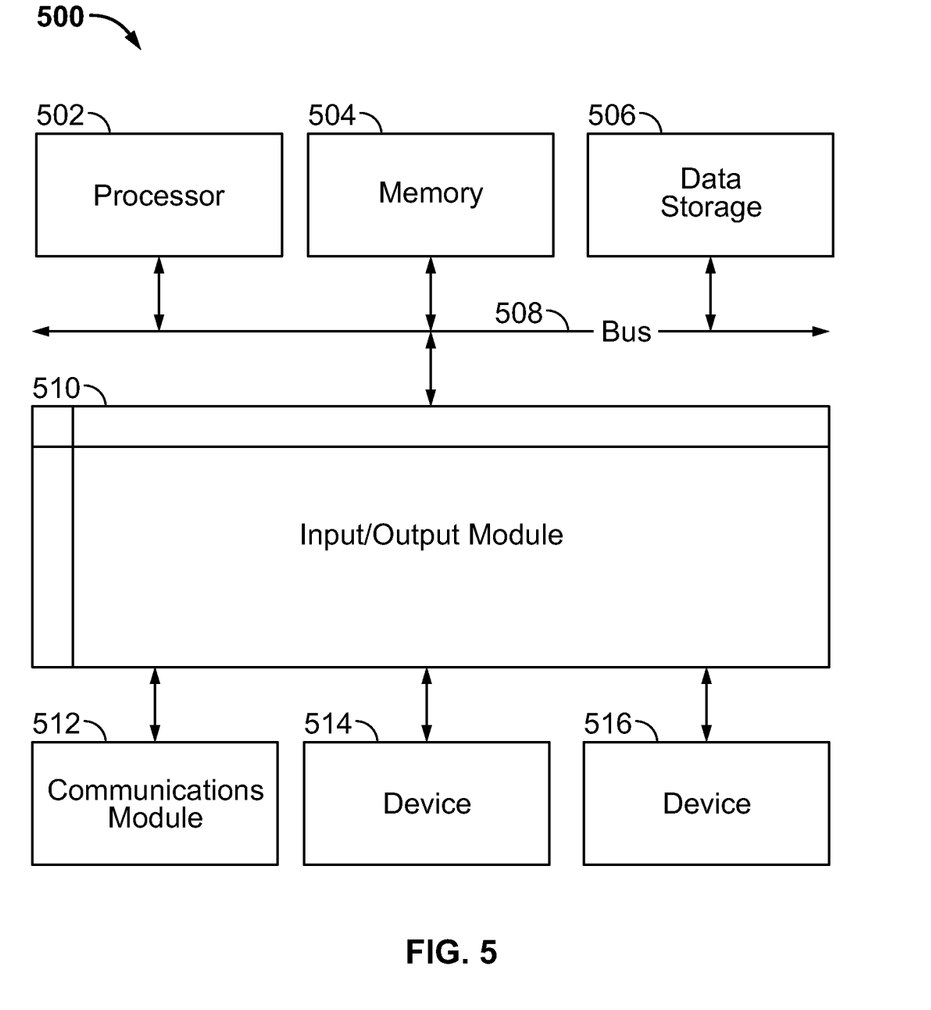
FIG. 5 is a block diagram illustrating an exemplary computer system with which the clients and server of FIG. 2 can be implemented.

FIG. 5 is a block diagram illustrating an exemplary computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, the input/output module 510 is configured to connect to multiple devices, such as an input device 514 and/or output device 516 (e.g., touchscreen device 216). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the clients 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for switching between open web pages in a web browser using a dragging motion across a touchscreen device, the method comprising:
   receiving an input of a touch gesture comprising a dragging motion via a touchscreen interface of the touchscreen device;
   determining whether the touch gesture begins within a predetermined distance from a first lateral edge of the touchscreen interface and proceeds towards a second lateral edge of the touchscreen interface; and
   in response to determining that the touch gesture begins within the predetermined distance from the first lateral edge and proceeds towards the second lateral edge, controlling the switching of a currently displayed open web page in the web browser to another one of a plurality of open web pages in the web browser based on the touch gesture,
   wherein a selection of which open web page to switch to is determined based on a pixel distance of the dragging motion of the touch gesture and a threshold based on a number of the plurality of open web pages in the web browser.

2. The computer-implemented method of claim 1, wherein the dragging motion begins in an input area defined in the web browser between the first lateral edge of the touchscreen interface, a predefined distance from the first lateral edge of the touchscreen interface towards the second lateral edge of the touchscreen interface, and a lateral height of the touchscreen interface.

3. The computer-implemented method of claim 2, wherein a touch gesture received within the input area is used for switching of the currently displayed open web page in the web browser to another one of a plurality of opened web pages in the web browser, and a touch gesture received outside the input area within the web browser is used for interacting with the currently displayed open web page.

4. The computer-implemented method of claim 1, wherein the selection of which open web page to switch to is also determined based on a velocity of the dragging motion of the touch gesture.

5. The computer-implemented method of claim 1, wherein the switching from the currently displayed open web page in the web browser to the another one of the plurality of open web pages in the web browser is completed when the input of the touch gesture is completed.

6. The computer-implemented method of claim 1, wherein the input is receivable within a predetermined distance from any lateral edge of the touchscreen interface.

7. The computer-implemented method of claim 1, wherein the input of the touch gesture is received at the first lateral edge of a touchscreen interface.

8. The computer-implemented method of claim 1, further comprising providing, for display, the open web page to which the web browser will be switched to during the dragging motion.

9. The computer-implemented method of claim 1, further comprising providing, for display, an indicator of a location of the touch gesture on the touchscreen interface.

10. The computer-implemented method of claim 1, wherein content displayed within the predetermined distance from the first lateral edge of the touchscreen interface is made non-active during the input of the touch gesture that begins within the predetermined distance from the first lateral edge and proceeds towards the second lateral edge.

11. The computer-implemented method of claim 1,
wherein the touch gesture beginning within an input area defined by the predetermined distance from the first lateral edge and proceeding towards the second lateral edge comprises the touch gesture moving in a first direction,
wherein the controlling the switching of the currently displayed open web page in the web browser to the another one of a plurality of open web pages in the web browser based on the touch gesture comprises switching from the currently displayed open web page to the another one of the plurality of open web pages in the first direction, and
wherein if the touch gesture continues in a second direction opposite the first direction, switching from the another one of the plurality of open web pages to a further one of the plurality of open web pages in the second direction opposite the first direction.

12. A system for switching between open web pages in a web browser using a dragging motion across a touchscreen device, the system comprising:
a memory comprising a web browser; and
a processor configured to:
receive an input of a touch gesture comprising a dragging motion via a touchscreen interface of the touchscreen device;
determine whether the touch gesture begins within a predetermined distance from a first lateral edge of the touchscreen interface and proceeds towards a second lateral edge of the touchscreen interface;
in response to determining that the touch gesture begins within the predetermined distance from the first lateral edge and proceeds towards the second lateral edge, control, based on the touch gesture, the switching of a currently displayed open web page in the web browser to another one of a plurality of open web pages in the web browser; and
provide, for display, the open web page to which the web browser will be switched to during the dragging motion,
wherein a selection by a processor of which open web page to switch to is determined based on a pixel distance of the dragging motion of the touch gesture and a threshold based on a number of the plurality of open web pages in the web browser.

13. The system of claim 12, wherein the dragging motion begins in an input area defined in the web browser between the first lateral edge of the touchscreen interface, a predefined distance from the first lateral edge of the touchscreen interface towards the second lateral edge of the touchscreen interface, and a lateral height of the touchscreen interface.

14. The system of claim 13, wherein a touch gesture received within the input area is used for switching of the currently displayed open web page in the web browser to another one of a plurality of open web pages in the web browser, and a touch gesture received outside the input area within the web browser is used for interacting with the currently displayed open web page.

15. The system of claim 12, wherein a selection of which open web page to switch to is also determined based on a velocity of the dragging motion of the touch gesture.

16. The system of claim 12, wherein the input is receivable within a predetermined distance from any lateral edge of the touchscreen interface.

17. The system of claim 12, wherein the input of the touch gesture is received at the first lateral edge of a touchscreen interface.

18. The system of claim 12, further comprising providing, for display, an indicator of a location of the touch gesture on the touchscreen interface.

19. The system of claim 12, wherein the processor is configured to make non-active content displayed within the predetermined distance from the first lateral edge of the touchscreen interface is during the input of the touch gesture that begins within the predetermined distance from the first lateral edge and proceeds towards the second lateral edge.

20. A computing device comprising a processor and a memory, the memory storing instructions that, when executed by the processor, provide a web browser with functionality for switching between open web pages, the web browser comprising:
an input area configured to receive an input of a touch gesture comprising a dragging motion via a touchscreen interface, the input area defined in the web browser between a first lateral edge of the touchscreen interface, a predefined distance from the first lateral edge of the touchscreen interface towards a second lateral edge of the touchscreen interface, and a lateral height of the touchscreen interface; and a document viewer configured to control, based on the touch gesture, using a processor, and in response to a determining that the touch gesture begins within the input area and proceeds towards the second lateral edge, the switching of a currently displayed open web page in the web browser to another one of a plurality of open web pages in the web browser, wherein a selection of which open web page to switch to is determined based on a distance of the dragging motion of the touch gesture.

21. The web browser of claim 20, wherein content displayed within the input area is made non-active during the input of the touch gesture that begins within the input area and proceeds towards the second lateral edge.

22. A non-transitory machine-readable storage medium comprising machine-readable instructions for causing a processor to execute a method for switching between open web pages in a web browser using a dragging motion across a touchscreen device, the method comprising:

receiving, within a first input area defined in the web browser between a first lateral edge of a touchscreen interface, a predefined distance from the first lateral edge of the touchscreen interface towards a second lateral edge of the touchscreen interface, and a lateral height of the touchscreen interface, an input of a touch gesture comprising a dragging motion via the touchscreen interface of the touchscreen device;

determining whether the touch gesture begins within the first input area and proceeds towards the second lateral edge;

in response to determining that the touch gesture begins within the first input area and proceeds towards the second lateral edge, controlling, based on the touch gesture, the switching of a currently displayed open web page in the web browser to another one of a plurality of open web pages in the web browser; and providing, for display, the open web page to which the web browser will be switched to and an indicator of a location of the touch gesture on the touchscreen interface during the dragging motion, wherein a selection of which open web page to switch to is determined based on a pixel distance of the dragging motion of the touch gesture and a threshold based on a number of the plurality of open web pages in the web browser.

23. The non-transitory machine-readable storage medium of claim 22, wherein content displayed within the first input area is made non-active during the input of the touch gesture that begins within the first input area and proceeds towards the second lateral edge.

* * * * *